(12) United States Patent
Falk et al.

(10) Patent No.: US 11,820,663 B2
(45) Date of Patent: Nov. 21, 2023

(54) CRYSTALLINE FILM OF CARBON NANOTUBES

(71) Applicant: International Business Machines Corporation, Armonk, NY (US)

(72) Inventors: Abram L. Falk, Port Chester, NY (US); Damon B. Farmer, White Plains, NY (US); Lynne M. Gignac, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 748 days.

(21) Appl. No.: 15/896,185

(22) Filed: Feb. 14, 2018

(65) Prior Publication Data
US 2019/0248654 A1 Aug. 15, 2019

(51) Int. Cl.
| | |
|---|---|
| *B32B 9/00* | (2006.01) |
| *C01B 32/174* | (2017.01) |
| *C01B 32/168* | (2017.01) |
| *B32B 37/06* | (2006.01) |
| *B32B 37/00* | (2006.01) |
| *B32B 37/24* | (2006.01) |
| *B82Y 30/00* | (2011.01) |
| *B82Y 40/00* | (2011.01) |

(52) U.S. Cl.
CPC ............ C01B 32/174 (2017.08); B32B 9/007 (2013.01); B32B 37/025 (2013.01); B32B 37/06 (2013.01); B32B 37/24 (2013.01); C01B 32/168 (2017.08); *B32B 2262/106* (2013.01); *B32B 2307/704* (2013.01); *B32B 2313/04* (2013.01); *B82Y 30/00* (2013.01); *B82Y 40/00* (2013.01); *C01B 2202/02* (2013.01); *C01B 2202/08* (2013.01); *Y10S 977/75* (2013.01); *Y10S 977/842* (2013.01); *Y10S 977/847* (2013.01); *Y10T 428/30* (2015.01)

(58) Field of Classification Search
CPC ....... B82Y 30/00; B82Y 40/00; Y10T 428/30; Y10S 977/742; C01B 2202/00
USPC .......................................... 428/408; 423/448
See application file for complete search history.

(56) References Cited

U.S. PATENT DOCUMENTS

| | | | |
|---|---|---|---|
| 6,303,094 B1 | 10/2001 | Kusunoki et al. | |
| 7,378,075 B2 | 5/2008 | Someya et al. | |

(Continued)

FOREIGN PATENT DOCUMENTS

| | | |
|---|---|---|
| CN | 1598694 A | 3/2005 |
| CN | 1715181 A | 1/2006 |

(Continued)

OTHER PUBLICATIONS

Thess et al., "Crystalline ropes of metallic carbon nanotubes," Science, vol. 273, No. 5274, 1996, pp. 483-487.

(Continued)

*Primary Examiner* — Daniel H Miller
(74) *Attorney, Agent, or Firm* — Garg Law Firm, PLLC; Rakesh Garg; Peter Edwards

(57) ABSTRACT

A membrane is electrically charged to a polarity. A surface of carbon nanotubes (CNTs) in a solution is caused to acquire a charge of the polarity. The solution is filtered through the membrane. An electromagnetic repulsion between the membrane of the polarity and the CNTs of the polarity causes the CNTs to spontaneously align to form a crystalline structure.

15 Claims, 11 Drawing Sheets

(56) References Cited

U.S. PATENT DOCUMENTS

| | | | |
|---|---|---|---|
| 7,459,121 | B2 | 12/2008 | Liang et al. |
| 7,781,635 | B1 | 8/2010 | Sutto et al. |
| 8,865,604 | B2 | 10/2014 | Wasynczuk |
| 9,044,713 | B2 | 6/2015 | Ratto et al. |
| 10,005,671 | B2 | 6/2018 | White et al. |
| 2005/0269285 | A1 | 12/2005 | Jung et al. |
| 2008/0041791 | A1 | 2/2008 | Cooper et al. |
| 2009/0008712 | A1 | 1/2009 | Choi et al. |
| 2010/0098877 | A1* | 4/2010 | Cooper ............... B01D 53/228 427/551 |
| 2011/0155312 | A1 | 6/2011 | Feng et al. |
| 2012/0295091 | A1 | 11/2012 | Pasquali et al. |
| 2014/0319044 | A1* | 10/2014 | Giannelis ............ B01D 61/147 210/321.6 |
| 2016/0368771 | A1* | 12/2016 | White .................. C01B 32/168 |
| 2017/0096339 | A1* | 4/2017 | He ...................... B01D 71/021 |

FOREIGN PATENT DOCUMENTS

| | | |
|---|---|---|
| CN | 1867392 A | 11/2006 |
| CN | 101158663 A | 4/2008 |
| CN | 101549866 A | 10/2009 |
| CN | 101974179 A | 2/2011 |
| CN | 102107865 A | 6/2011 |
| CN | 102427133 A | 4/2012 |
| CN | 103349964 A | 10/2013 |
| CN | 103723700 A | 4/2014 |
| CN | 103956470 A | 7/2014 |
| CN | 105431377 A | 3/2016 |
| CN | 106477550 A | 3/2017 |

OTHER PUBLICATIONS

He et al., "Wafer-scale monodomain films of spontaneously aligned single-walled carbon nanotubes," Nature Nanotechnology, vol. 11, No. 7, 2016, pp. 633-638.

Chiu et al., "Strong and broadly tunable plasmon resonances in thick films of aligned carbon nanotubes," Nano Letters, vol. 17, No. 9, 2017, pp. 5641-5645.

PCT, International Searching Authority, PCT/IB2019/050673, Apr. 12, 2019.

He et al., Wafer-scale monodomain films of spontaneously aligned single-walled carbon nanotubes, Nature Nanotechnology, vol. 11, 2016, pp. 633-638.

Chiu et al., Strong and Broadly Tunable Plasmon Resonances in Thick Films of Aligned Carbon Nanotubes, Nano Letters, vol. 17, 2017, pp. 5641-5645.

Deutsches Patent—Und Markenamt, OA1, Apr. 22, 2021.

Deutsches Patent—Und Markenamt, OA1, Translation, Apr. 22, 2021.

P201707116CN01, OA1, Application No. 201980010809.3, Dec. 23, 2021.

P201707116GB1, Examination Report, Application No. GB2012654. 6, dated Feb. 23, 2022.

P201707116GB1, Reply to Examination Report, Application No. GB2012654.6, dated Mar. 24, 2022.

P201707116JP01, Application No. 2020-540809, Receive Rejection, dated Jun. 22, 2022.

P201707116JP01, Application No. 2020-540809, Receive Rejection English Translation, dated Jun. 22, 2022.

P201707116CN01, Application No. 201980010809.3, OA3, dated Aug. 25, 2022.

P201707116CN01, OA1 English Translation, Application No. 201980010809.3, Dec. 23, 2021.

P201707116CN01, OA2, Application No. 201980010809.3, May 23, 2022.

P201707116CN01, Application No. 201980010809.3, OA4, Nov. 22, 2022.

P201707116CN01, Application No. 201980010809.3, OA4 English Translation, Nov. 22, 2022.

P201707116CN01, Application No. 201980010809.3, OA3 English Translation, Aug. 25, 2022.

Fang et al., Graphene and Rail Transportation, English Translation, Aug. 31, 2016.

Fang et al., Graphene and Rail Transportation, Aug. 31, 2016.

P201707116CN01, Application No. 201980010809.3, Notice of Rejection, dated Mar. 30, 2023.

* cited by examiner

CRYSTALLINE FILM OF CARBON NANOTUBES

TECHNICAL FIELD

The present invention relates generally to a manufactured arrangement of carbon nanotubes, and a method and apparatus for said manufacturing. More particularly, the present invention relates to a crystalline film of carbon nanotubes, and a method and apparatus for manufacturing crystalline film of carbon nanotubes.

BACKGROUND

Within the Scope of the Illustrative Embodiments—

(a) Carbon nanotube (CNT): Refers to a single-walled hollow open-ended cylindrical tube-like structure that is formed substantially entirely of carbon atoms.

(b) Film: Refers to a sheet-like formation whose thickness is negligible as compared to its surface area. For example, the thickness may be of the order of 30-300 nanometers (nm) as compared to a surface area of 1 square inch.

(c) Crystalline CNT (CONT), crystalline structure of CNTs: refers to CNTs arranged in such a manner that in a cross-section of a CNT film, the centers of the individual CNTs form a periodic arrangement (a lattice). For instance, the CNTs could be arranged in a hexagonal lattice, in which case the centers of any 3 nearest-neighbor CNTs would form an equilateral triangle.

(d) Crystalline CNT film (CCF): a film formed of CNTs where more CNTs are in a crystalline arrangement than not. A verification method-based definition of CCF is shown in FIG. 4 and described later herein.

Carbon nanotubes have several remarkable physical properties and have wide-ranging applications in electronics, optics, and materials engineering. CNTs are one of the highest ampacity electrical conductors among all materials. They are also one of the strongest materials, with a tensile strength approximately 100 times greater than that of steel.

CNTs also have many applications in optics, particularly given that the energy of carbon-nanotube excitons is in the infrared telecom range. CNTs also have many prospective applications to energy science, including to supercapacitors, photovoltaics, and batteries.

Certain applications of carbon nanotubes rely on isolating carbon nanotubes and incorporating them as individuals into electronic or optical devices. However. other applications involve multitudes of carbon nanotubes in thick or thin films. Typically, these films of nanotubes are disordered, i.e., where the CNTs are not arranged in any particular arrangement. Previously, in addition to disordered films of carbon nanotubes, crystalline ropes of carbon nanotubes have been fabricated. However the rope size has been small (with diameters <50 nm) and the placement of the ropes themselves has been disordered.

Furthermore, structurally, a rope is substantially different from a film. The surface area of a film is analogous to the cross-section of the rope and the thickness of the film is analogous to the length of the rope, and the thickness is no longer negligible relative to the surface area for a rope structure, as it is for a film structure.

The illustrative embodiments recognize that ordering the carbon nanotubes into monolithic crystals would be desirable for many applications. A CCF is an example of a monolithic crystal of ordered CNTs contemplated herein. For example, for electronics, the hexagonally-ordered CCF would have the highest possible density of nanotubes and therefore the highest ampacity. As another example, for optical applications, this high density of nanotubes would result in stronger optical activity. The stronger optical activity could translate into brighter emission for applications relying on carbon nanotube luminescence, and stronger nonlinearity for optical applications of carbon nanotubes' strong chi-3 optical nonlinearity. For mechanical applications, the nanotube crystalline film would be expected to be stronger than films of disordered nanotubes.

The illustrative embodiments describe the structure of monolithic crystal of ordered CNTs, e.g., the CCF described herein, as well as a method for making them. The illustrative embodiments provide a method that forms uniformly dense films of crystalline carbon nanotubes. A CCF produced by an illustrative embodiment are readily scalable to wafer-size films using the described process. Such wafer-size films are particularly useful in semiconducting and/or metallic film fabrication using a wafer of a suitable substrate material.

Furthermore, the method of the illustrative embodiments produces a polycrystalline film, i.e., a film that comprises multiple crystalline domains. Experiments have shown the method to be capable of producing polycrystalline domains, in which each domain is approximately 25 nm×25 nm, and domains of 100 or more CNTs are observed. Stated another way, the observed lattices in experimentation have been found to have repeating triangular structures forming the hexagonal lattices with domain sizes of approximately 25 nm×25 nm. The lattice constants are approximately 1.6 nm. The overall diameter of an experimentally produced CCF was 1 inch, and the thickness was tunable from 30 nm up to 300 nm. Note that within the contemplations of the illustrative embodiments, a domain is a collection of a plurality crystalline structures where two or more crystalline structures share one or more nanotubes.

SUMMARY

The illustrative embodiments provide a method, apparatus, and an article of manufacture. An embodiment includes a method that electrically charges a membrane to a polarity. The embodiment causes a surface of carbon nanotubes (CNTs) in a solution to acquire a charge of the polarity. The embodiment filters the solution through the membrane, wherein an electromagnetic repulsion between the membrane of the polarity and the CNTs of the polarity causes the CNTs to spontaneously align to form a crystalline structure. Thus, the embodiment produces a crystalline film of carbon nanotubes.

Another embodiment further assists, as a part of the filtering, the solution to filter through the membrane, the assisting comprising applying a pressure to one side of the membrane. Thus, the embodiment provides an assistive method for producing a crystalline film of carbon nanotubes.

In another embodiment, the pressure is a negative pressure on a filtrate-side of the membrane. Thus, the embodiment assists in producing a crystalline film of carbon nanotubes using a specific type of pressure.

In another embodiment, the pressure is a positive pressure on a solution-side of the membrane. Thus, the embodiment assists in producing a crystalline film of carbon nanotubes using a specific type of pressure.

Another embodiment further exposes the membrane to a plasma, wherein the plasma imparts a negative charge to the membrane, and wherein the CNTs in the solution are also negatively charged. Thus, the embodiment produces the crystalline film by causing the nanotubes to align on the membrane.

In another embodiment, a powder comprising the CNTs is mixed with the liquid medium and a surfactant to form the solution, wherein molecules of the surfactant have a charge of the polarity, and wherein a molecule of the surfactant adheres to a CNT thereby imparting the CNT the polarity of charge. Thus, the embodiment produces the crystalline film by causing the nanotubes to acquire an electrical characteristic that helps align the nanotubes on the membrane.

In another embodiment, the CNTs are single-walled carbon nanotubes. Thus, the embodiment produces the crystalline film of a specific type of carbon nanotubes.

In another embodiment, the membrane is porous to a liquid medium of the solution but is impervious to the CNTs. Thus, the embodiment produces the crystalline film using a specific type of membrane.

In another embodiment, the crystalline structure is a part of a polycrystalline structure of CNTs, wherein the polycrystalline structure of CNTs forms a crystalline carbon nanotubes film (CCF). Thus, the embodiment produces a polycrystalline film of carbon nanotubes.

In another embodiment, the crystalline structure comprises at least three CNTs whose cylindrical axes are arranged in an equilateral triangle. Thus, the embodiment produces a polycrystalline film of carbon nanotubes where the nanotubes organize themselves in a specific crystalline structure.

An embodiment places, on a transfer surface, a membrane containing a crystalline carbon nanotubes film (CCF), a separation medium intervening between the CCF and the transfer surface. The embodiment removes the separation medium. The embodiment removes the membrane. The embodiment anneals the CCF, wherein the annealing removes a surfactant molecule from the CCF and bonds the CCF to the transfer surface. Thus, the embodiment prepares a CCF for use in semiconducting and/or metallic film fabrication.

Another embodiment further applies a denaturing agent to the CCF prior to the annealing, the denaturing altering an electrical charge of the surfactant molecule in the CCF. Thus, the embodiment purifies the CCF for use in the fabrication.

Another embodiment further heats, as a part of the annealing, the transfer surface with the CCF to a temperature in a chamber while maintaining a level of vacuum in the chamber. Thus, the embodiment bonds the CCF to a wafer for use in the fabrication.

Another embodiment further applies pressure to the membrane to evenly distribute the separation medium between the CCF and the transfer surface. Thus, the embodiment provides a specific manner of bonding the CCF to the wafer for use in the fabrication.

Another embodiment further applies a drying agent, wherein the separation medium comprises water, and wherein the drying agent removes the separation medium by drying the water. The embodiment dries, using the drying agent, the membrane. Thus, the embodiment prepares the membrane for removal.

Another embodiment further applies a solvent, the solvent dissolving the membrane as a part of removing the membrane. Thus, the embodiment removes the membrane leaving only the CCF for fabrication.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
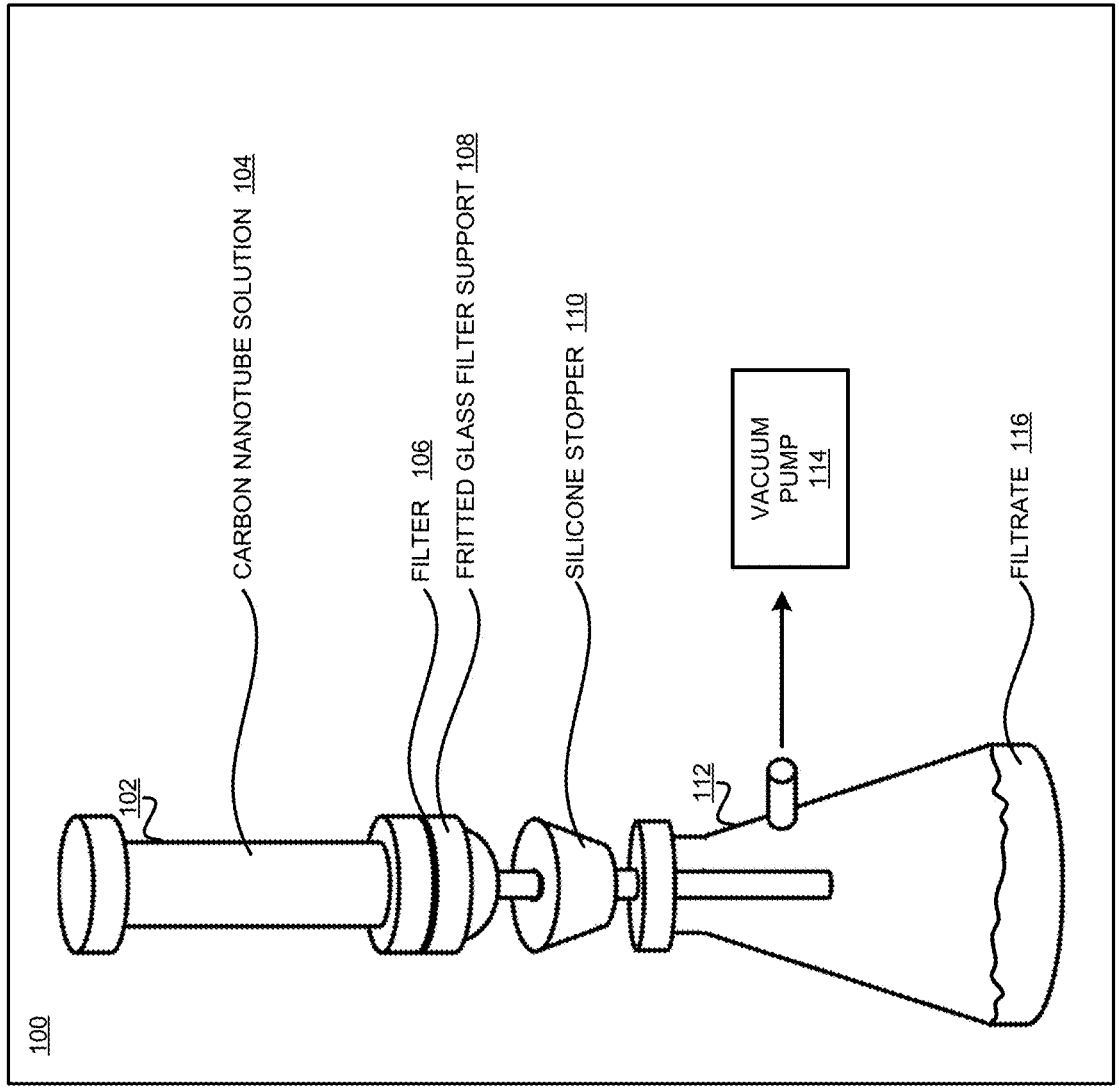
FIG. 1 depicts a block diagram of an example simplified apparatus for manufacturing a crystalline film of carbon nanotubes in accordance with an illustrative embodiment.

The illustrative embodiments used to describe the invention generally address and solve the above-described needs and other problems related to fabricating a crystalline film of carbon nanotubes. The illustrative embodiments provide a crystalline film of carbon nanotubes, and a method and apparatus to manufacture the crystalline film of carbon nanotubes.

An embodiment comprises a CCF described herein. Another embodiment comprises a method of manufacturing the CCF described herein. Another embodiment describes an apparatus manufacturing the CCF described herein. Another embodiment describes a method of using the CCF in a semiconducting and/or metallic film fabrication process.

A method of an embodiment can be implemented as a software application, which is configured to operate a CCF manufacturing apparatus as described herein. The software application implementing an embodiment can be configured as a modification of an existing wafer production system, as a separate application that operates in conjunction with an existing wafer production system, a standalone application, or some combination thereof.

For the clarity of the description, and without implying any limitation thereto, the illustrative embodiments are described using simplified laboratory-sized apparatus. From this disclosure, those of ordinary skill in the art will be able to scale the method described with respect to this laboratory-sized apparatus and the apparatus up to commercial manufacturing capacities without departing the scope of the illustrative embodiments.

For the clarity of the description, and without implying any limitation thereto, the illustrative embodiments are described using simplified laboratory-suitable process steps. From this disclosure, those of ordinary skill in the art will be able to optimize, tune, or adapt the described process steps for commercial manufacturing applications, and such adaptations are contemplated within the scope of the illustrative embodiments.

For the clarity of the description, and without implying any limitation thereto, the illustrative embodiments are described using example materials in various process steps. From this disclosure, those of ordinary skill in the art will be able to alter or substitute a described material with functionally equivalent material for similar purpose as described in a process step of an embodiment. Such substitutions are contemplated within the scope of the illustrative embodiments.

Furthermore, simplified diagrams of the example structures, elements, and device(s) are used in the figures and the illustrative embodiments. In an actual fabrication or use of a proposed CCF, additional structures that are not shown or described herein, or structures different from those shown and described herein, may be present without departing the scope of the illustrative embodiments.

Differently shaded portions in the two-dimensional drawing of the example structures, layers, and formations are intended to represent different structures, layers, and formations in the example fabrication, as described herein. Where applicable, the different structures, layers, and formations may be fabricated using suitable materials that are known to those of ordinary skill in the art as belonging to the same class of materials described herein.

A specific shape, location, position, or dimension of a shape depicted herein is not intended to be limiting on the illustrative embodiments unless such a characteristic is expressly described as a feature of an embodiment. The shape, location, position, dimension, or some combination thereof, are chosen only for the clarity of the drawings and the description and may have been exaggerated, minimized, or otherwise changed from actual shape, location, position, or dimension that might be used in actual photolithography to achieve an objective according to the illustrative embodiments.

An embodiment when implemented in an application causes a semiconducting and/or metallic film fabrication process to perform certain steps as described herein. The steps of the fabrication process are depicted in the several figures. Not all steps may be necessary in a particular fabrication process. Some fabrication processes may implement the steps in different order, combine certain steps, remove or replace certain steps, or perform some combination of these and other manipulations of steps, without departing the scope of the illustrative embodiments.

A CCF of an embodiment described herein, comprises substantial advancement in material sciences. A manner of forming a CCF and making the CCF ready for use in a wafer-based fabrication process as described herein is presently unavailable. Thus, a substantial advancement of material sciences is achieved by forming a new material, i.e., the CCF. Substantial advancement of semiconducting and/or metallic film fabrication technology is achieved by the described process of transferring the CCF to a transfer surface, such as to a wafer.

The illustrative embodiments are described with respect to certain types of apparatus, timing, pressure values, speeds, dimensions, temperatures, angles, percentages, substances, structures, formations, layers, orientations, directions, steps, operations, planes, materials, numerosity, systems, environments, components, and applications only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Additional structures, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to FIG. 1, this figure depicts a block diagram of an example simplified apparatus for manufacturing a crystalline film of carbon nanotubes in accordance with an illustrative embodiment. Apparatus 100 includes container 102 in which solution 104 of CNT power and a suitable medium is held.

Note that solution 104 may be a colloidal solution prone to eventual separation of the powder and the medium. In one embodiment, the CNT powder is a powder of single-wall, primarily semiconducting nanotubes, whose average diameter is approximately 1.41 nm. In one embodiment, the medium in which the powder is mixed to form solution 104 is a solution of water and a suitable surfactant, such as, but not limited to sodium dodecylbenzenesulfonate. It is desirable to remove any large nanotubes bundles and amorphous carbon from solution 104. For such removal, solution 104 may be centrifuged to separate these and other large/heavy particulate matter from solution 104.

The illustrative embodiments have recognized that a surfactant in the medium introduces electrically polar molecules, i.e., molecules that as a whole are electrically neutral but have a positive charge on one side and a negative charge on another side. The surfactant molecules bind, or otherwise associate in a suitable manner, with the CNTs in the powder. Consequently, the surface of the CNTs becomes charged. In the example case of the surfactant being sodium dodecylbenzenesulfonate, a negative charge becomes associated with the surface of the CNTs in solution 104. Generally, any component of solution 104, which is capable of adhering to the CNTs and imparting an electrical charge to the CNTs can be adapted for use in solution 104.

Filter 106 is a membrane that is porous to the liquid of solution 104 but not to the CNTs. In other words, filter 106 is designed to block particles of size comparable to the size of CNTs. In one non-limiting example, filter 106 has a 0.05 micrometer (μm) pore size, such as a Whatman Nuclepore track-etched polycarbonate hydrophilic membrane of 0.05 μm pore size.

An embodiment charges membrane 106 with an electrical charge. In one non-limiting example case, membrane 106 is exposed to an air plasma, which imparts a negative electrical charge to membrane 106. It is Important to note that the charge imparted to membrane 106 should be of the same electrical polarity as the charge imparted by the surfactant to the CNTs. If the CNTs in solution 104 are negatively charged, then membrane 106 should also be negatively charged. If the CNTs in solution 104 are positively charged, then membrane 106 should also be positively charged.

The same polarity of the charges of the CNTs and membrane 106 create a repulsive electromagnetic force between the CNTs and membrane 106. The repulsive force allows the CNTs to move relative to one another as well as relative to membrane 106 such that the CNTs spontaneously align in the described lattice and larger polycrystalline structures as solution 104 is filtered through membrane 106.

Membrane 106 can be held in place by any suitable mechanism, such as support 108. Support 108 or other suitable structure holds filter 106 in a flow from the solution-side to the filtrate side of apparatus 100. Container 102 forms the solution-side of apparatus 100. A filtrate capturing mechanism, such as funnel-stopper assembly 110 coupling to container 112 forms the filtrate-side of apparatus 100.

The filtering of solution 104 through membrane 106 should be at a pace that allows the CNTs the opportunity to move and align as described herein. In one non-limiting case, the speed of filtration is set in such a manner that the speed of only gravity-assisted filtration is the threshold speed of filtration, with the desired speed of filtration being slightly but not significantly above the threshold, e.g., within a tolerance band of ten percent of the threshold speed. In one example case, the speed of filtration was set at 0.8 milliliter per hour.

In one embodiment, the desired speed of filtration is achieved by applying negative pressure, i.e., partial vacuum, in container 112 on the filtrate-side of apparatus 100. For example, vacuum pump 114 can be coupled with container 112 to draw filtrate 116 through membrane 106 at the desired speed.

The speed of filtration is a factor of atmospheric pressure, density altitude, temperature of solution 104, ambient temperature, and an applied negative or positive pressure. When negative pressure is applied as vacuum on the filtrate-side, the vacuum can be adjusted to adjust the speed of filtration with due consideration to other variables affecting the speed of filtration.

Figure 2:
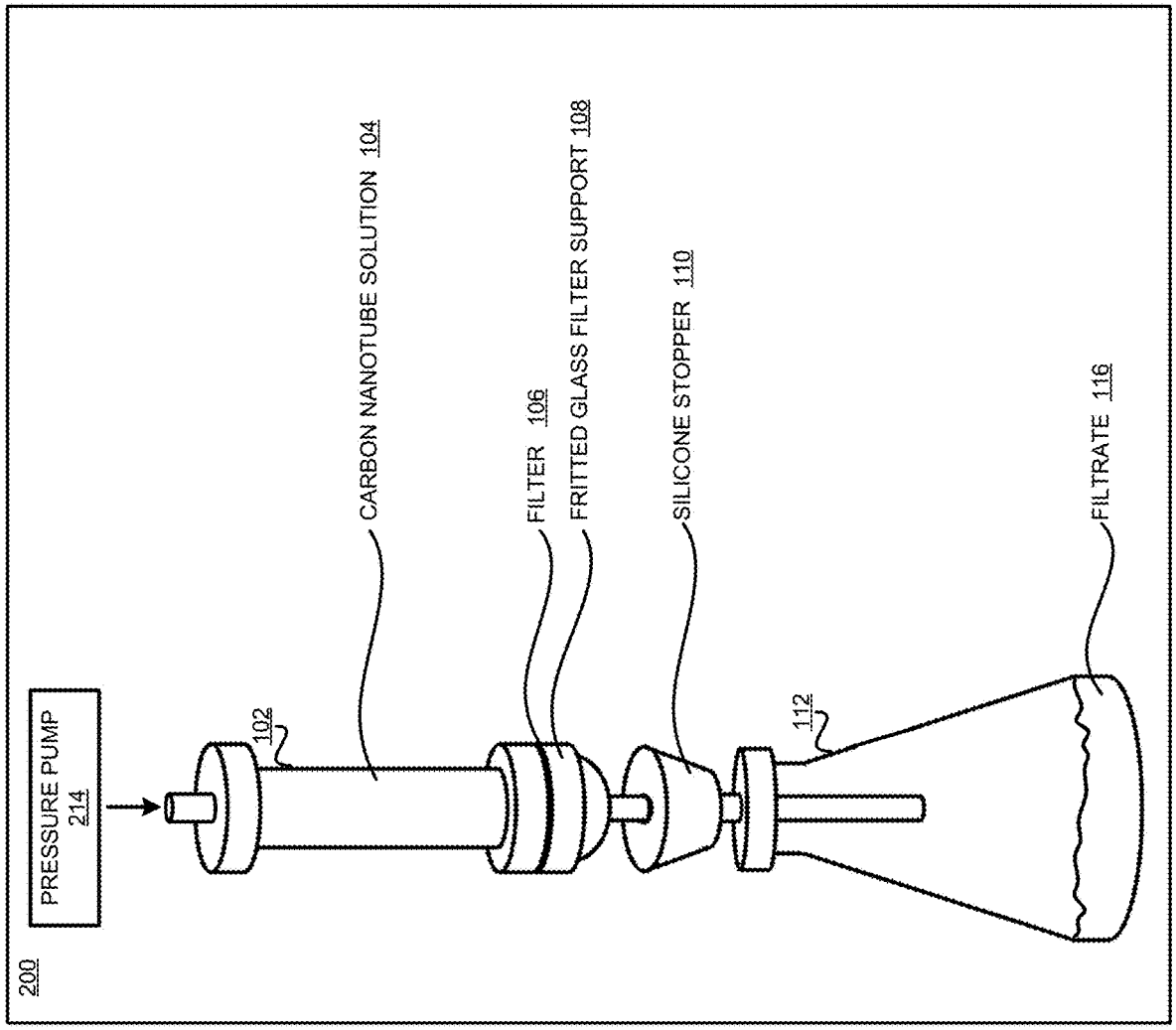
FIG. 2 depicts a block diagram of another example simplified apparatus for manufacturing a crystalline film of carbon nanotubes in accordance with an illustrative embodiment.

With reference to FIG. 2, this figure depicts a block diagram of another example simplified apparatus for manufacturing a crystalline film of carbon nanotubes in accordance with an illustrative embodiment. In apparatus 200, container 102, solution 104, membrane 106, support 108, and assembly 110 are all arranged and operate in the manner of apparatus 100 in FIG. 1.

In one embodiment, the desired speed of filtration is achieved by applying positive pressure on the solution-side of apparatus 200. For example, container 102 is pressurized with a calculated amount of positive pressure to push solution 104 through membrane 106 at a desired rate of filtration. Pressure pump 214 can be coupled with container 102 to apply the positive pressure.

The speed of filtration is a factor of atmospheric pressure, density altitude, temperature of solution 104, ambient temperature, and an applied negative or positive pressure. When positive pressure is applied as vacuum on the filtrate-side, the pressure can be adjusted to adjust the speed of filtration with due consideration to other variables affecting the speed of filtration.

Only for the clarity of the description and without implying any limitation thereto, the subsequent description and figures assume negatively charged CNTs, negatively charged membrane, and a vacuum drawn filtration process of FIG. 1.

In one embodiment, the vacuum pressure is changed during filtration. For example, initially as a first step, the vacuum pressure may be set below a low threshold, e.g., 2-3 Torr, for a first period, e.g., 5-6 hours. Such low vacuum causes the filtration to occur at a slow rate, e.g., 1 drop per 200 seconds. Slow filtration over this period results in a thin crystalline film of CNTs. After the period of the first step elapses, the membrane appears visibly dark due to this initially formed thin crystalline film. In a second step, the vacuum pressure is then increased to a second threshold, e.g., 8 Torr, for a second period. The solution passes through the membrane at a rate of 1 drop per 90 seconds during this second period. To avoid prolonged surface tension disrupting the film as the final amount of solution passes through the membrane, the vacuum pressure is increased to a high threshold, e.g., approximately 1000 Torr, for a third period, just before the solution runs out. Finally, the membrane is left to dry at the high threshold pressure.

Only for the clarity of the description and not to imply any limitation on the illustrative embodiments, the vacuum is assumed to be unchanging to avoid distraction from other features being described. From this disclosure, those of ordinary skill in the art will be able to adjust the positive or negative pressure in combination with other described steps, and such combinations are contemplated within the scope of the illustrative embodiments.

Figure 3:
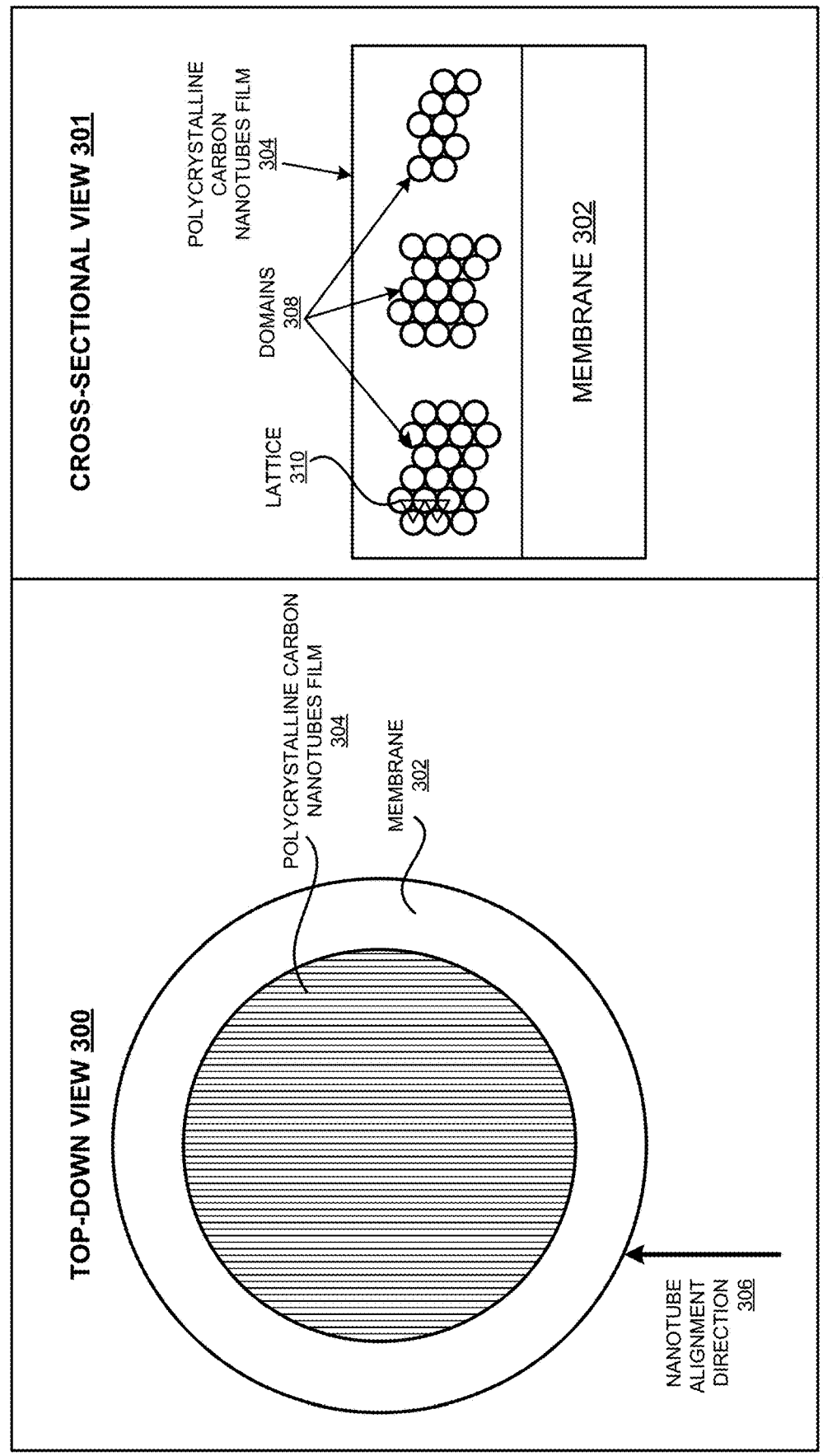
FIG. 3 depicts an example formation of CCF in accordance with an illustrative embodiment.

With reference to FIG. 3, this figure depicts an example formation of CCF in accordance with an illustrative embodiment. View 300 is a top view of membrane 302 and polycrystalline film 304 of CNTs formed thereupon. View 301 is a cross-sectional view of membrane 302 and film 304.

Membrane 302 is an example of membrane 106 in FIG. 1. Membrane 302 is charged with the same polarity as the polarity associated with the CNTs of the solution. Film 304 is deposited on the solution-side of membrane 302 due to the filtration process. As seen in simplified representative view 300, the CNTs in film 304 generally align in direction 306 (represented by the parallel lines in film 304).

View 301 shows that the CNTs are arranged in one or more domains 308, each domain 308 including a plurality of CNTs. Furthermore, the CNTs in a domain 308 are organized in triangular lattice 310 as described herein. A domain 308 may or may not be connected with another domain 308, i.e., two domains may or may not share a common CNT. Different domains 308 may include different numbers of CNTs in lattice 310 formations. The CNTs within a domain are ordered, i.e., arranged according to lattice 310, however, the CNTs in one domain 308 need not be ordered relative to the CNTs in another domain 308, i.e., need not be organized as lattice 310 relative to one another.

Figure 4:
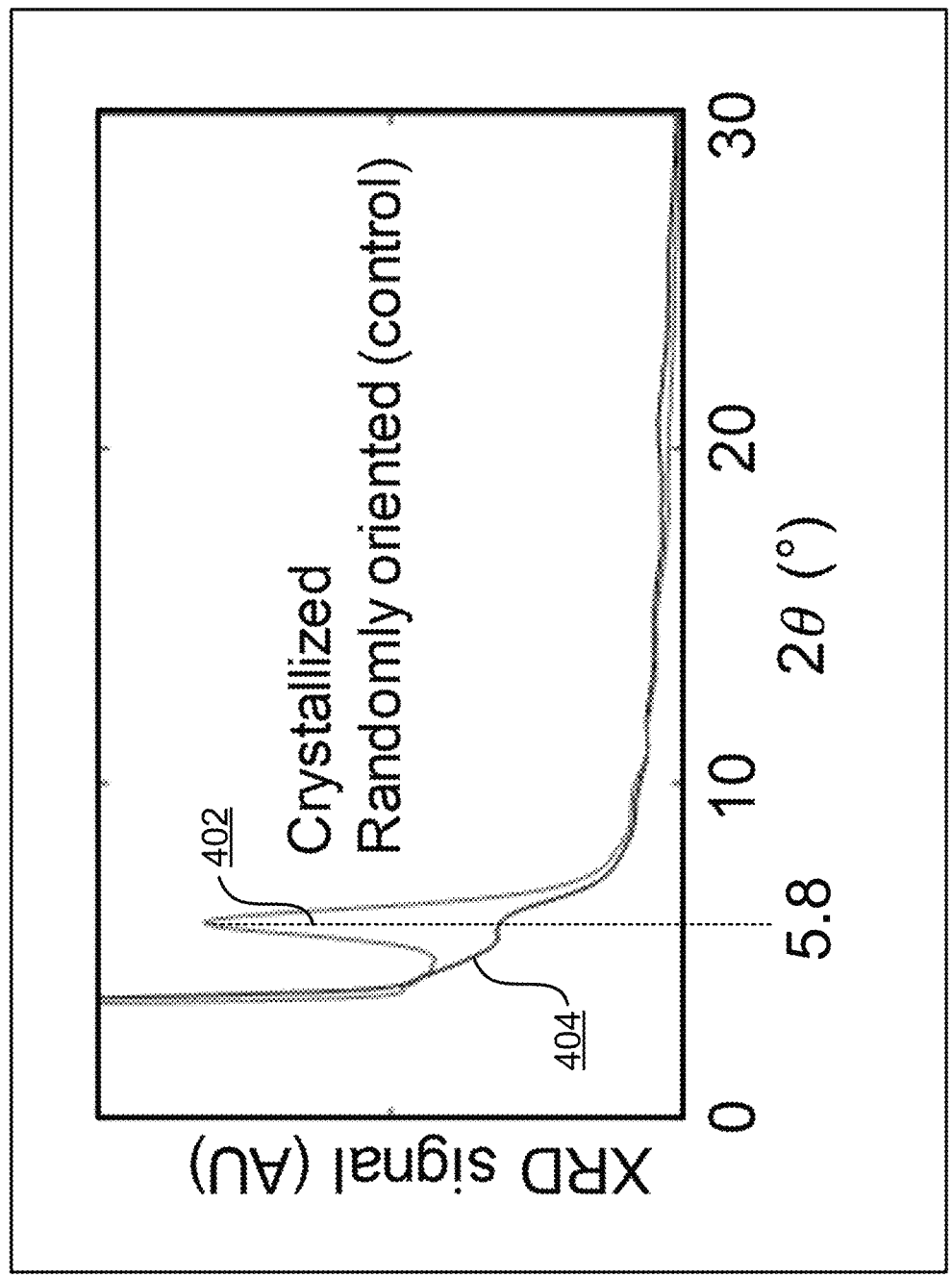
FIG. 4 depicts a verification method for confirming the abundance of crystalline structures in a given film in accordance with an illustrative embodiment.

With reference to FIG. 4, this figure depicts a verification method for confirming the abundance of crystalline structures in a given film in accordance with an illustrative embodiment. A film of CNTs may have the CNTs organized in a crystalline structure, or lattice, as described herein, or may be randomly positioned relative to one another. A film may contain more crystalline domains than randomly oriented CNTs, or more randomly oriented CNTs than crystalline domains. A film that has more crystalline domains than randomly oriented CNTs is regarded as a CCF, and the verification process described with respect to this figure determines whether a film is a CCF.

An experiment sets up a given film for x-ray diffraction imaging. Grazing incidence X-ray diffraction (XRD) method is used in the experiment to characterize the crystallinity of the aligned CNT arrays. The grazing incidence mode is particularly effective at measuring thin films. The low angle diffraction, which is related to >1 nm lattice constant from the lattice of CNTs (as opposed to the much higher angle diffraction from the carbon lattices of the comprising CNTs) is observed in the experiment.

Assume that the film is a CCF where the crystalline structures are aligned in one direction, as would be expected of Carbon nanotubes in a crystalline arrangement. In the experiment, an x-ray beam is made incident upon the film at an angle of θ from a perpendicular to the plane of the film. If the given film is a CCF, a strong peak is observed in the reflected x-ray signal, as in graph 402, at approximately 2θ=5.8° in at least one orientation of the film relative to the x-ray beam.

If the given film is not a CCF, the randomly oriented CNTs cause the reflection graph to not exhibit any significant peak, as in graph 404. Furthermore, the lack of a significant peak in graph 404 remains substantially unchanged in any orientation of the film relative to the x-ray beam.

The 2θ value corresponds with the lattice spacing of the aligned nanotube arrays. When the film is a CCF, the strong peak signal is noted over substantially the entire sample area of the film, suggesting crystalline alignment of nanotubes across a significant fraction of the film area, as well as a uniform degree of crystallinity.

A peak in a graph is a change in a slope of the graph from negative slope to a positive slope and back to a negative slope within a zone of the graph. The more sudden the change in one or more slopes, the more pronounced or strong the peak, and vice-versa.

Graph 404 could be considered a baseline graph against which to measure the peaks in other graphs, to detect the presence of crystalline arrangement of nanotubes in a given film. The presence of the peak at only a single 2θ value in graph 402 for substantially all regions of the film qualifies the film as a CCF. In contrast, smaller peaks can appear for multiple 2θ values, and are not as pronounced as compared to the peak in graph 402, when the film is not a CCF. A film is not a CCF when the film either entirely includes, or when a majority of the film comprises, non-crystalline structures of carbon nanotubes.

Figure 5:
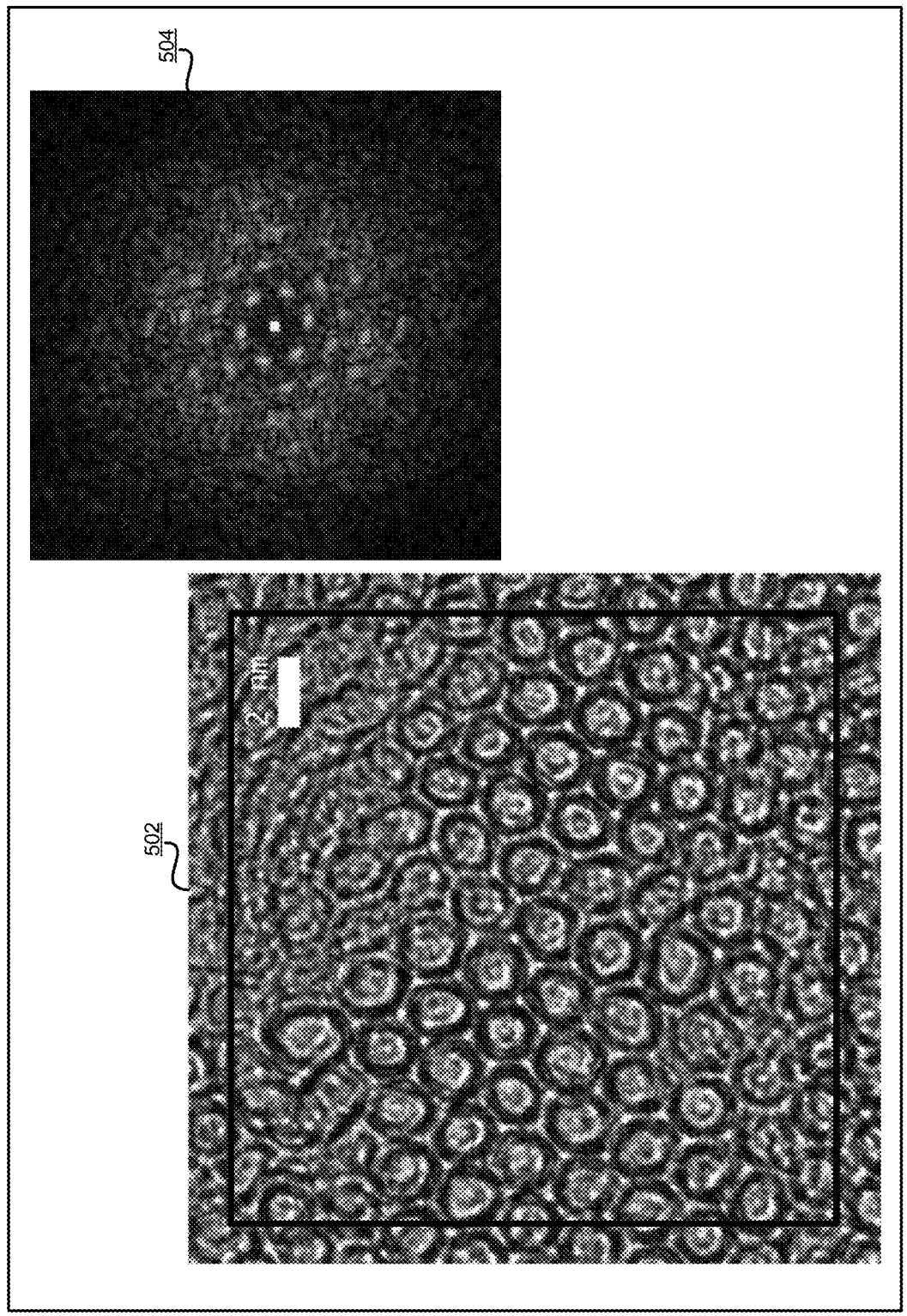
FIG. 5 depicts microscopic images of a cross-section of a CCF formed in accordance with an illustrative embodiment.

With reference to FIG. 5, this figure depicts microscopic images of a cross-section of a CCF formed in accordance with an illustrative embodiment. Image 502 is a Transmission Electron Microscope (TEM) image of a CCF. The round cross-sections of nanotubes arranged in hexagonal crystalline structure, and a single domain is visible in image 502. The hexagonal spacing between adjacent nanotubes in the crystalline structures of image 502 is of the order of 1.61±0.04 nm.

Image 504 is a TEM diffractogram of an area of a CCF. The periodic hexagonal arrangement of diffraction peaks in image 504 is characteristic of electrons being diffracted from a hexagonal lattice of objects. The spacing of the diffraction peaks is consistent with the lattice constant of 1.61 nm that is directly measured in image 502.

Figure 6:
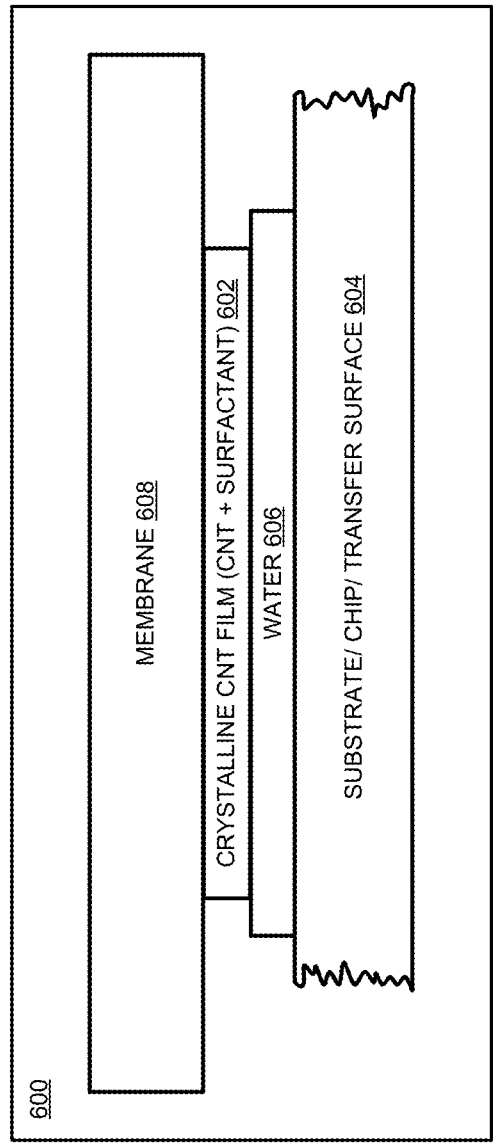
FIG. 6 depicts a block diagram of a step in an example process for transferring a CCF to a wafer in accordance with an illustrative embodiment.

With reference to FIG. 6, this figure depicts a block diagram of a step in an example process for transferring a CCF to a wafer in accordance with an illustrative embodiment. CCF 602 is an example of CCF 304 in FIG. 3, in which the CNTs are still adhering to the charged surfactant molecules.

Transfer surface 604 is a surface of a suitable wafer substrate material. For example, substrate 604 may be, but is not limited to, silicon and sapphire, both of which are commonly available in wafer forms for fabrication. Depending on the material of the substrate, some pre-processing of the wafer might be useful. For example, electrodes could be patterned or the native oxide could be removed by buffered hydrofluoric acid.

Transfer surface 604 is the surface on which CCF 304 has to be layered, deposited, or transferred from the membrane, such as from membrane 302 in FIG. 3. To transfer film 602, liquid medium 606, such as water, is placed on transfer surface 604. Note that just a drop of water might be sufficient to form a thin film of water over the wafer. Membrane 608, which is an example of membrane 302 in FIG. 3, is then placed on the liquid-coated transfer surface such that CCF 602 is in contact with liquid 606.

Although not shown in configuration 600, a suitable mechanism may apply pressure to membrane 608 so as to displace or evenly distribute liquid 606 under CCF 602. For example, a glass slide or sheet can be placed over membrane 608 and pressed to cause the distribution or displacement.

Figure 7:
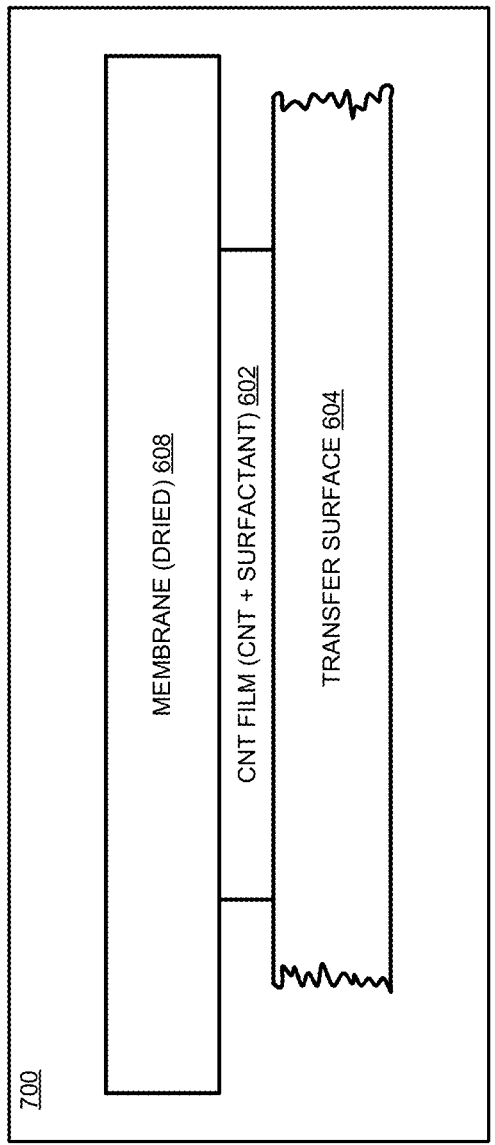
FIG. 7 depicts a block diagram of another step in an example process for transferring a CCF to a wafer in accordance with an illustrative embodiment.

With reference to FIG. 7, this figure depicts a block diagram of another step in an example process for transferring a CCF to a wafer in accordance with an illustrative embodiment. Drying agent 702 is applied to configuration 600. Drying agent 702 may be heat, or some other suitable drying agent. For example, in one experiment, nitrogen gas was used as drying agent 702 to dry configuration 600.

The drying step removes liquid 606 from configuration 600 and also causes membrane 608 to become dry. The drying step results in configuration 700.

Figure 8:
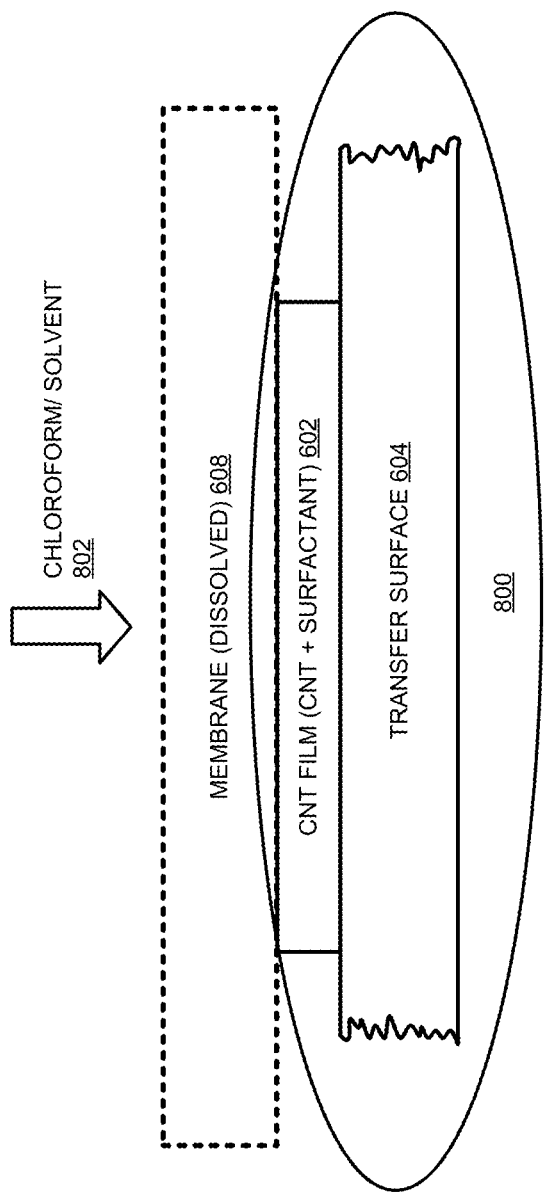
FIG. 8 depicts a block diagram of another step in an example process for transferring a CCF to a wafer in accordance with an illustrative embodiment.

With reference to FIG. 8, this figure depicts a block diagram of another step in an example process for transferring a CCF to a wafer in accordance with an illustrative embodiment. Solvent 802 is applied to configuration 700. Solvent 802 may be any suitable material that is capable of dissolving membrane 608 without adversely affecting CCF 602. For example, in one experiment, Chloroform was used as solvent 802 to dissolve membrane 608.

The dissolving step removes membrane 608 from configuration 700. The dissolving step results in configuration 800.

Figure 9:
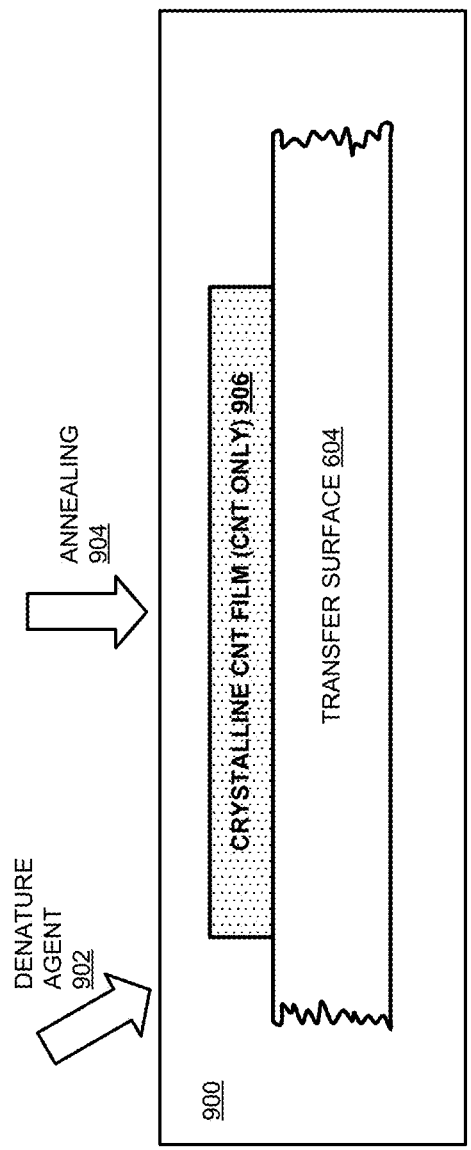
FIG. 9 depicts a block diagram of another step in an example process for transferring a CCF to a wafer in accordance with an illustrative embodiment.

With reference to FIG. 9, this figure depicts a block diagram of another step in an example process for transferring a CCF to a wafer in accordance with an illustrative embodiment. The surfactant is removed from CCF 602 layer. A suitable denaturing agent 902 is optionally applied to configuration 800 to denature the surfactant and/or remove any polymer residue from previous steps. Nitric acid is one non-limiting example of denaturing agent 902.

The surfactant is then removed from CCF 602 by applying annealing operation 904 to configuration 800. One non-limiting way of performing annealing 904 is to heat configuration 800 (after optional denaturing) to 500° C. in a vacuum oven at $10^{-7}$ torr for a period, e.g., for 2 hours. Resulting CCF 906 is substantially free of surfactant molecules, and is bonded to transfer surface 604 of the wafer. The CCF layered wafer of resulting configuration 900 is now ready for further device-specific fabrication.

Figure 10:
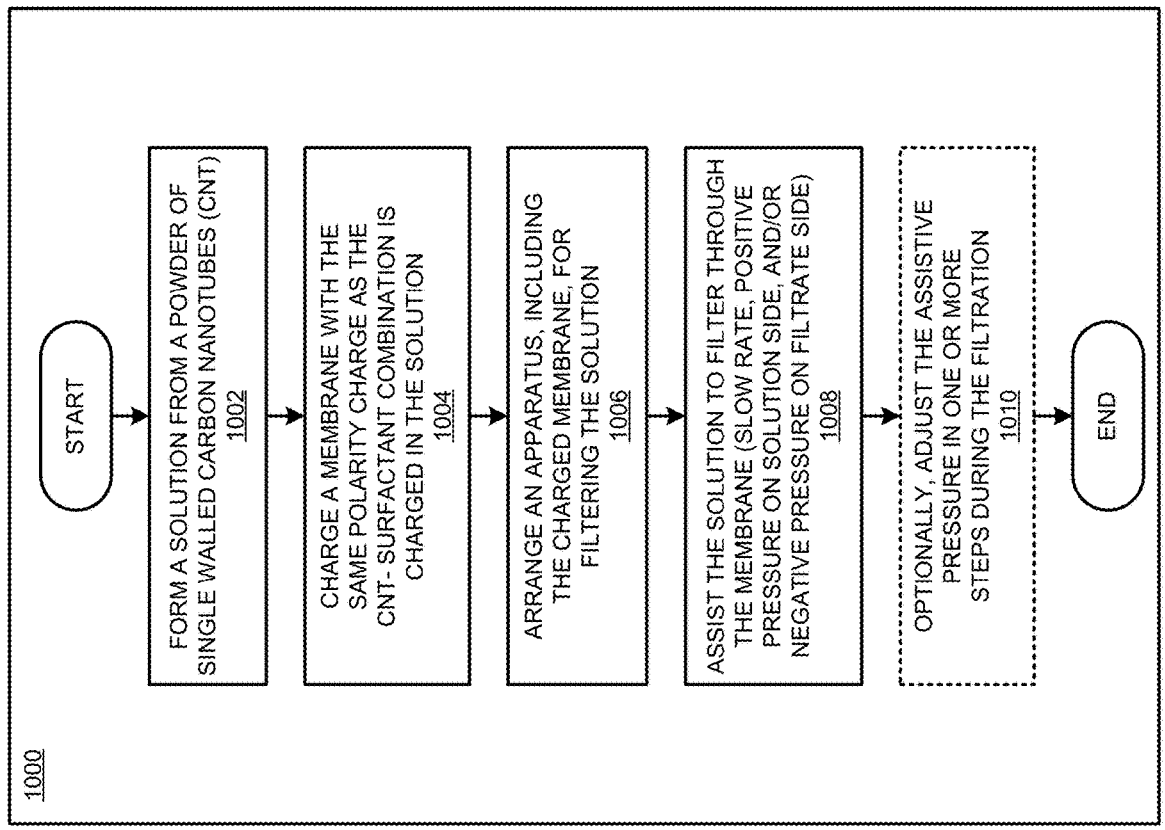
FIG. 10 depicts a flowchart of an example process for manufacturing a CCF in accordance with an illustrative embodiment.

With reference to FIG. 10, this figure depicts a flowchart of an example process for manufacturing a CCF in accordance with an illustrative embodiment. Process 1000 can be implemented using apparatus 100 or 200 in FIG. 1 or 2, respectively.

A solution is formed using powdered CNT in a suitable liquid and surfactant (block 1002). A suitably sized membrane is charged with the same polarity charge as the CNT-surfactant combination is charged in the solution (block 1004). An apparatus is arranged to filter the solution using the charged membrane and pressure (block 1004). The solution is assisted through the charged membrane at a suitable rate of filtration (block 1008). Optionally, the pressure-assist can be adjusted as described herein, in one or more steps during the filtration period (block 1010). Process 1000 deposits a film of CNT and surfactant molecules on the membrane and ends thereafter.

Figure 11:
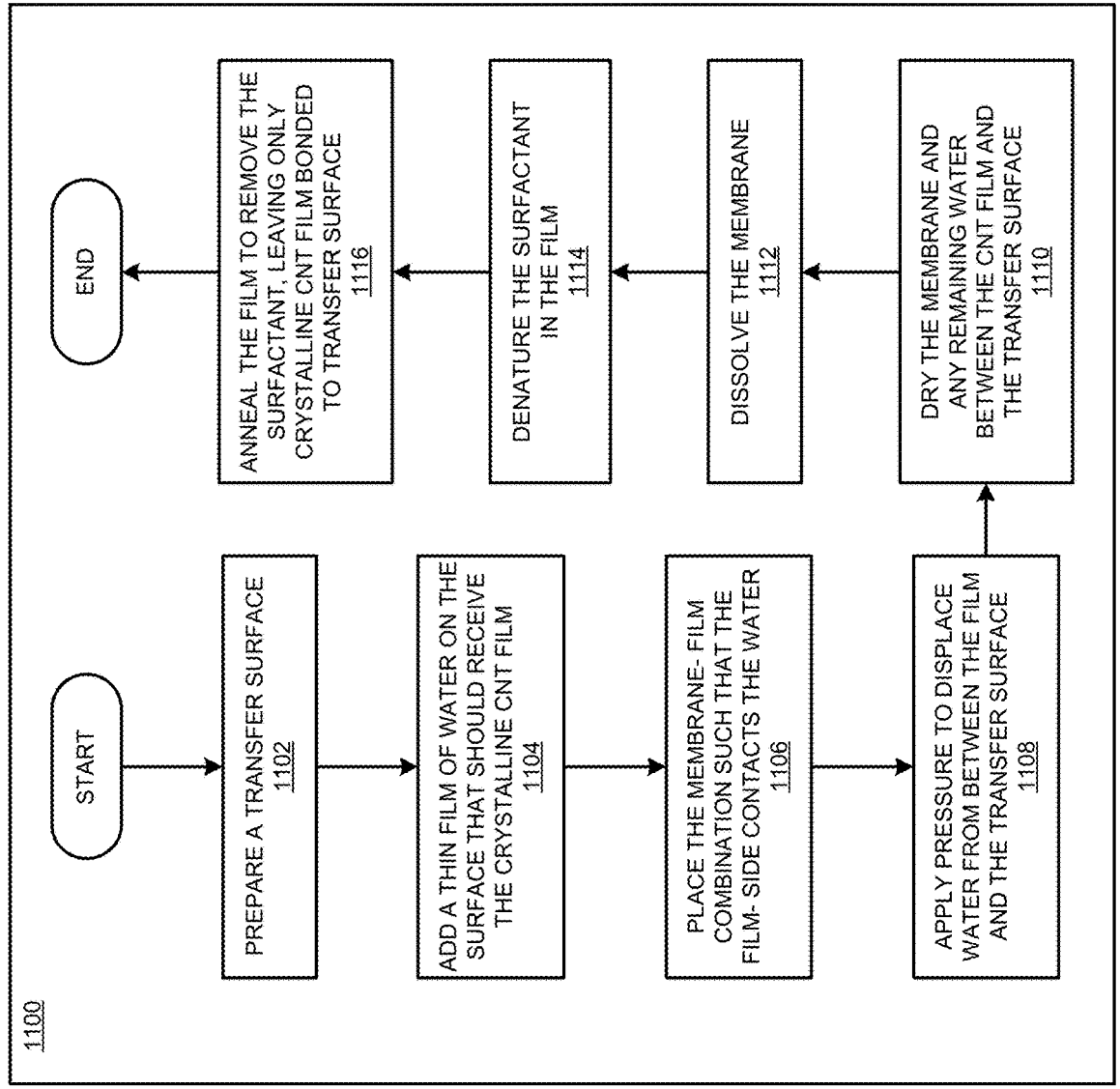
FIG. 11 depicts a flowchart of an example process for using a CCF in semiconducting and/or metallic film fabrication in accordance with an illustrative embodiment.

With reference to FIG. 11, this figure depicts a flowchart of an example process for using a CCF in semiconducting and/or metallic film fabrication in accordance with an illustrative embodiment. Process 1100 can be implemented using a wafer as described with respect to FIG. 6-9.

A surface of the wafer is prepared as the transfer surface to receive the CCF (block 1102). A liquid, such as water, is applied to form an intermediate film between the CCF and the transfer surface (block 1104). The membrane film combination of FIG. 3 is placed on the transfer surface such that the CCF contacts the liquid film (block 1106).

Optionally, pressure is applied to the membrane to displace the liquid film or to evenly distribute the liquid film under the CCF (block 1108). The membrane is dried and any remaining liquid between the CCF and the transfer surface is also dried using a suitable drying agent (block 1110). The membrane is dissolved using a suitable solvent (block 1112). The surfactant in the CCF is denatured (block 1114). The remaining CCF contains substantially only crystalline carbon nanotubes.

The remaining CCF is annealed to the transfer surface (block 1116). The process ends thereafter.

While certain steps and processes are described with certain structures, it is to be understood that the steps and/or processes can be adapted to achieve the results described herein within the scope of the illustrative embodiments. While certain materials are used in multiple layers or structures, it is to be understood that substitute materials or different but functionally equivalent materials can be used in place of the described materials at any layers described herein within the scope of the illustrative embodiments. While certain methods have been used at certain steps, it is to be understood that a step may be omitted, added, or modified at a described method to achieve functionally similar result within the scope of the illustrative embodiments. While certain operations are described as a "step", several operations can be combined together to form a single step in a process described herein. While certain orientations have been referred to as "top" and "bottom" with reference to an example vertical orientation of the proposed device, it is to be understood that the device can be reoriented laterally such that the top and bottom become left/right or right/left, or bottom and top, or front/back or back/front, as the reorientation case may be.

Thus, a CCF, a manufacturing method therefor, and a method of using the CCF in semiconducting and/or metallic film fabrication, are provided in the illustrative embodiments. Where an embodiment or a portion thereof is described with respect to a type of material, the fabrication method, system or apparatus, the software implementation, or a portion thereof, are adaptable or configurable for use with a different manifestation of that material.

The present invention may be a material, an apparatus, a method, and/or a computer program product at any possible technical detail level of integration. The computer program product may include a computer readable storage medium (or media) having computer readable program instructions thereon for causing a processor to carry out aspects of the present invention. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

What is claimed is:

1. A method comprising:
   imparting a first electrical charge on a membrane;
   combining carbon nanotubes (CNTs) with a solution that imparts a second electrical charge on surfaces of the CNTs and results in an electromagnetic repulsion between the membrane and the CNTs,
   wherein the membrane comprises pores that allow the solution to pass therethrough and block the CNTs from passing therethrough; and
   forming a film of aligned CNTs on a surface of the membrane by exposing the solution to a force that urges the solution through the membrane and thereby urges the CNTs against the membrane where the CNTs align in the presence of the electromagnetic repulsion,
   wherein the forming of the film by exposing the solution to a force comprises:
   exposing the solution to a first amount of force for a first period of time;
   exposing the solution to a second amount of force that is greater than the first amount of force for a second period of time; and
   exposing the solution to a third amount of force that is greater than the second amount of force for a third period of time.

2. The method of claim 1, further comprising:
   wherein the force comprises a pressure applied to the solution on one side of the membrane.

3. The method of claim 2, wherein the pressure is a negative pressure on a filtrate-side of the membrane.

4. The method of claim 2, wherein the pressure is a positive pressure on a solution-side of the membrane.

5. The method of claim 1, further comprising:
   exposing the membrane to a plasma, wherein the plasma imparts the first electrical charge to the membrane, wherein the first and second charges are both negative electrical charges.

6. The method of claim 1,
   wherein the combining of the CNTs with the solution comprises mixing a powder comprising the CNTs with a liquid medium and a surfactant, wherein the liquid medium and the surfactant form the solution,
   wherein molecules of the surfactant are electrically polar molecules; and
   wherein a molecule of the surfactant adheres to a CNT thereby imparting the second charge on the CNT.

7. The method of claim 1, wherein the CNTs are single-walled carbon nanotubes.

8. The method of claim 1, wherein the membrane is porous to a liquid medium of the solution but is impervious to the CNTs.

9. The method of claim 1, wherein the forming of the film of aligned CNTs comprises forming a crystalline structure that is a part of a polycrystalline structure of CNTs, wherein the polycrystalline structure of CNTs forms a crystalline carbon nanotubes film (CCF).

10. The method of claim 9, wherein the crystalline structure comprises at least three CNTs whose cylindrical axes are arranged in an equilateral triangle.

11. An apparatus to manufacture a crystalline carbon nanotubes film (CCF), comprising:
- a membrane having a first electrical charge;
- a solution containing carbon nanotubes (CNTs), the solution imparting a second electrical charge on surfaces of the CNTs and results in an electromagnetic repulsion between the membrane and the CNTs,
- wherein the membrane comprises pores that allow the solution to pass therethrough and block the CNTs from passing therethrough; and
- a filtering mechanism that forms a film of aligned CNTs on the surface of the membrane by exposing the solution to a force that urges the solution through the membrane and thereby urges the CNTs against the membrane where the CNTs align in the presence of the electromagnetic repulsion,
- wherein the forming of the film by exposing the solution to a force comprises:
- exposing the solution to a first amount of force for a first period of time;
- exposing the solution to a second amount of force that is greater than the first amount of force for a second period of time; and
- exposing the solution to a third amount of force that is greater than the second amount of force for a third period of time.

12. The apparatus of claim 11, further comprising:
an assisting mechanism, to assist in filtering the solution through the membrane, the assisting mechanism applying a pressure to one side of the membrane.

13. The apparatus of claim 12, wherein the assisting mechanism applies a negative pressure on a filtrate-side of the membrane.

14. The apparatus of claim 12, wherein the assisting mechanism applies a positive pressure on a solution-side of the membrane.

15. The apparatus of claim 11, further comprising:
Oxygen plasma, wherein the Oxygen plasma imparts the first electrical charge to the membrane, and wherein the first and second charges are both negative electrical charges.

* * * * *